US008988980B2

(12) United States Patent
Kim

(10) Patent No.: US 8,988,980 B2
(45) Date of Patent: Mar. 24, 2015

(54) RELAY DUALIZATION APPARATUS

(75) Inventor: Kyung Ho Kim, Cheongju-si (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 381 days.

(21) Appl. No.: 13/550,408

(22) Filed: Jul. 16, 2012

(65) Prior Publication Data

US 2013/0051215 A1  Feb. 28, 2013

(30) Foreign Application Priority Data

Aug. 26, 2011  (KR) ......................... 10-2011-0085748

(51) Int. Cl.
*H04L 29/14* (2006.01)

(52) U.S. Cl.
CPC ................ H04L 69/40 (2013.01); *Y04S 10/16* (2013.01); *Y04S 10/525* (2013.01)
USPC .......................................................... 370/216

(58) Field of Classification Search
CPC ....... H04L 69/40; Y04S 10/525; Y04S 10/18; Y04S 10/16
USPC .......................................... 370/216; 709/221
See application file for complete search history.

(56) References Cited

U.S. PATENT DOCUMENTS

2008/0244044 A1* 10/2008 Wimmer ........................ 709/221
2011/0179342 A1* 7/2011 Kim .............................. 714/807

FOREIGN PATENT DOCUMENTS

| CN | 101277030 | 10/2008 |
|---|---|---|
| CN | 101465563 | 6/2009 |
| CN | 101836122 | 9/2010 |
| CN | 102130784 | 7/2011 |

OTHER PUBLICATIONS

Haibo Liu et al., Integrated automation integration protection method and system, http://www.google.com/patents/CN101465563A?cl=en, English translation for Chinese Patent application CN 101465563.*
The State Intellectual Property Office of the People's Republic of China Application Serial No. 201210283243.1, Office Action dated Apr. 1, 2014, 9 pages.

* cited by examiner

*Primary Examiner* — Un C Cho
*Assistant Examiner* — Fangyan Deng
(74) *Attorney, Agent, or Firm* — Lee, Hong, Degerman, Kang & Waimey

(57) ABSTRACT

Provided is a relay dualization apparatus, in a substation automation system including at least one or more upper units and at least one or more lower units, the apparatus including a plurality of first relays receiving a power data from the lower unit using a predetermined communication method, and transmitting the power data to the upper unit, and receiving a control command from the upper unit and transmitting the control command to the lower unit, and a second relay performing communications with the plurality of first relays using the communication method to replace a relay that has generated an error in the plurality of relays.

7 Claims, 6 Drawing Sheets

RELAY DUALIZATION APPARATUS

Pursuant to 35 U.S.C. §119 (a), this application claims the benefit of earlier filing date and right of priority to Korean Patent Application No. 10-2011-0085748, filed on Aug. 26, 2011, the contents of which is hereby incorporated by reference in their entirety.

BACKGROUND OF THE DISCLOSURE

1. Field of Endeavor

The present disclosure relates to a relay dualization apparatus, and more particularly to a relay dualization apparatus used for substation automation system.

2. Background

This section provides background information related to the present disclosure which is not necessarily prior art.

Communications among relays in substation systems have been developed and will progress toward more economical and efficient ways.

A communication standard for communication between the secondary devices of a substation has been introduced by the International Electrotechnical Committee (IEC) as part of the standard IEC 61850 entitled "communication networks and systems in substations". In Korea, Jeju substation has been using the IEC 61850 protocol since 2005, followed by Sanchong substation in 2007.

Ethernet is used as a basic communication medium of IEC 61850 protocol. However, the standardized method of using Ethernet excludes a regulation on dualization that is required in the existing power system. The conventional power system forms a communication port in dualization for stability, or operates main/preliminary systems by installing same equipment in duplication.

The method of forming the communication port in duplication is disadvantageous in that, although economically advantageous, it takes many hours to restore an entire system, in a case there is generated an error in the system. Furthermore, the method of installing equipment in duplication may be advantageous due to its stability but is disadvantageous in that the installation cost is doubled in the course of system formation. Now, a conventional substation system will be described with reference to drawings.

FIG. 1 is a structural view of a substation system connected in hard-wired method according to prior art.

Relays (140 to 143) in the conventional substation system is connected to switch gears (150 and 152) as lower units and CT (Current Transformer)/PTs (Power Transformers, 151 and 153) using a wire, and process by receiving data information at a contact point.

Furthermore, the relays (140 to 143) relay data received from the lower units (150~153) via a predetermined protocol (e.g., Modbus or DNP, etc.) to a higher system including an interlocking unit (110), a RTU (Remote Terminal Unit, 120) and HMI (Human Machine Interface, 130) using RS-232/485 communication line.

The conventional system thus described in FIG. 1 uses a dualization method for dualization in which a preliminary device (relay B, 141) relative to a main device (relay A, 140) is formed in duplication, and the preliminary device (relay B, 141) is operated when an error is generated on the main device (relay A, 140). In other words, devices are installed in duplication to disadvantageously increase the installation cost.

FIG. 2 is a structural view illustrating a substation system using IEC 61850 protocol.

Referring to FIG. 2, the substation system using the IEC 61850 protocol is such that relays (250 to 253) receive data from lower units of switch gears (270 and 272) or CT/PTs (271 and 273) via Ethernet switches (260 and 261). The relays (250 to 253) transmit the data to a control center (200) and HMIs (220 and 221) via an Ethernet switch (230).

Although DNP or Modbus was used in the system illustrated in FIG. 1, the IEC 61850 is being used as a communication protocol in response to evolution to a digital substation system illustrated in FIG. 2. However, even in FIG. 2, the relays B (251 and 253) are used as preliminary devices of relays A (250 and 252) which are main bodies to disadvantageously increase an installation cost.

FIGS. 3a and 3b are exemplary views for illustrating a network method in a conventional substation system, where a substation system is shown that is configured with a network of each relay and HMIs (300 and 301) by way of a ring network and a star network.

As noted from the foregoing, the conventional digital substation system is disadvantageous in that relays are overlapping installed to increase the installation cost, such that a communication port is dually installed to form a ring network (FIG. 3a) or a star network (FIG. 3b).

In a ring network of FIG. 3a, the relay 1 (321) communicates with the HMI (300) via a switch (310) using a communication line connected to an upper side thereof (clockwise). Likewise, relays 2 and 3 (322, 323) communicate to the same direction. If there is generated an error in the communication line between the relays 1 (321) and the switch (310), the relay 1 (321) communicates with the HMI (300) via the switch (310) using a communication line connected to a bottom side thereof (counterclockwise). At this time, the relay 2 (322) and the relay 3 (323) also communicate counterclockwise.

In a star network of FIG. 3b, a relay 1 (324) communicates with the HMI (301) via a switch (311), but communicates with the HMI (301) via a switch (312), if there is generated an error on the communication line between the two. Relay 2 (325) and relay 3 (326) also communicate with the HMI (301) using a normal state of communication line among the switch 1 (311) and the switch 2 (312) on the same condition.

That is, in the conventional substation system using the above networks, in a case there is generated an error on the communication line, communication is carried out using an opposite direction of communication line (FIG. 3a) or a switch is replaced (FIG. 3b). This may be an economical method as a dualization scheme to network errors, but due to the fact that a relay is an important device conducting monitoring and control in a complex power system, such that frequent losses may be generated due to unstable system state and overload. Thus, a defective state continues for an entire system until an apparatus generated with an error is returned to a normal state, if a relay is generated with an error in the conventional system, disadvantageously causing a fatal influence to the system.

SUMMARY OF THE DISCLOSURE

This section provides a general summary of the disclosure, and is not a comprehensive disclosure of its full scope or all of its features.

Accordingly, embodiments of the present disclosure may relate to a relay dualization apparatus that may substantially obviate one or more of the above disadvantages due to limitations and disadvantages of related art, and it is therefore an object of the present disclosure to provide a relay dualization apparatus capable of immediately correcting an error on a relay in a case an error is generated on the relay while observing an international standard protocol.

Technical problems to be solved by the present disclosure are not restricted to the above-mentioned, and any other technical problems not mentioned so far will be clearly appreciated from the following description by skilled in the art.

In one general aspect of the present disclosure, there is provided a relay dualization apparatus in a substation automation system including at least one or more upper units and at least one or more lower units, the apparatus comprising: a plurality of first relays receiving a power data from the lower unit using a predetermined communication method, and transmitting the power data to the upper unit, and receiving a control command from the upper unit and transmitting the control command to the lower unit; and a second relay performing communications with the plurality of first relays using the communication method to replace a relay that has generated an error in the plurality of relays.

Preferably, but not necessarily, each of the plurality of first relays comprises a first storage storing the power data and the control command.

Preferably, but not necessarily, the second relay comprises a second storage receiving a data communicated by the plurality of first relays from the plurality of first relays and storing the data.

Preferably, but not necessarily, the second relay performs a real-time communication with the plurality of first relays.

Preferably, but not necessarily, the second relay periodically performs a communication with the plurality of first relays at a predetermined period.

Preferably, but not necessarily, the second relay detects an error of a relay in the plurality of first relays and notifies the error to the upper unit.

Preferably, but not necessarily, the upper unit transmits to the second relay a switch command replacing the erroneous relay with the second relay.

Preferably, but not necessarily, the second relay replaces an erroneous relay.

Preferably, but not necessarily, the relay dualization apparatus further comprises a first hub switching at least one or more upper units with a plurality of first relays and the second relay.

Preferably, but not necessarily, the relay dualization apparatus further comprises a second hub switching the plurality of first relays and the second relay with at least one or more lower units.

Preferably, but not necessarily, the predetermined communication method is Ethernet communication method.

The relay dualization apparatus according to the present disclosure has an advantageous effect in that a reserve relay is added to a single system to dispense with a need of repetitive dualization of each apparatus, and to replace a minimum reserve relay for restoring an error (fault) with other relays, whereby an economical realization of system can be enabled and errors can be immediately coped with.

Another advantageous effect is that an impossible problem of statically determining a reserve relay can be solved, in view of the fact that an error used to occur at any time in the conventional power system, and data can be real-time or periodically exchanged with other relays to enable application to dynamically changing power systems.

BRIEF DESCRIPTION OF THE DRAWINGS

In order to explain the principle of the present disclosure, some accompanying drawings related to its preferred embodiments are below reported for the purpose of illustration, exemplification and description, although they are not intended to be exhaustive. The drawing figures depict one or more exemplary embodiments in accord with the present concepts, by way of example only, not by way of limitations. In the figures, like reference numerals refer to the same or similar elements.

Thus, a wide variety of potential practical and useful embodiments will be more readily understood through the following detailed description of certain exemplary embodiments, with reference to the accompanying exemplary drawings in which.

DETAILED DESCRIPTION

Figure 1:
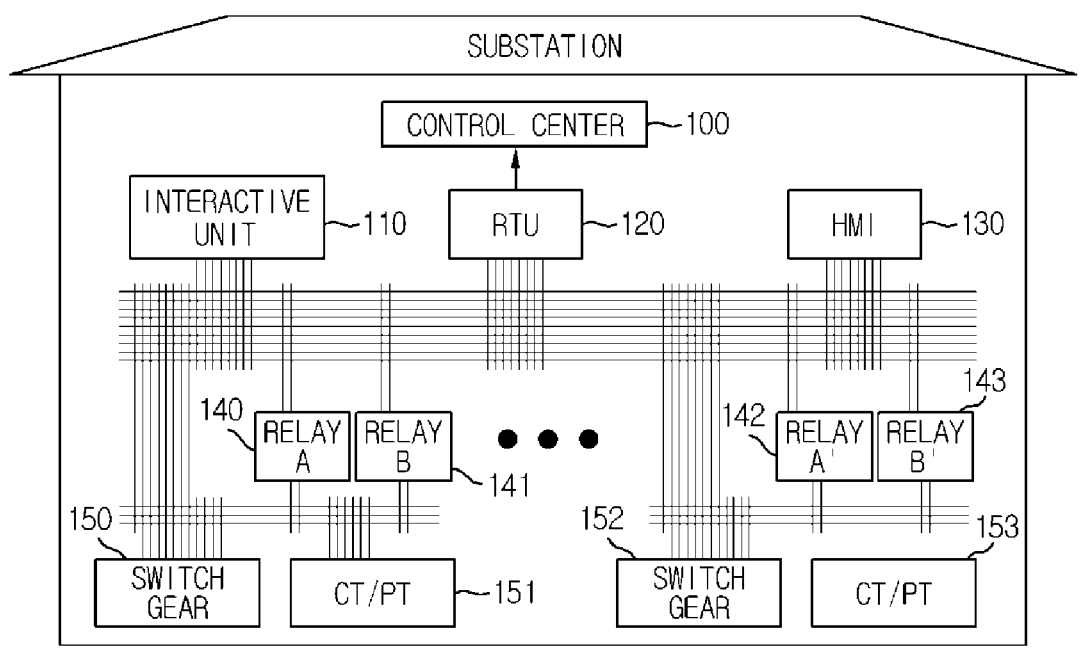
FIG. 1 is a structural view of a substation system connected in hard-wired method according to prior art.
Figure 2:
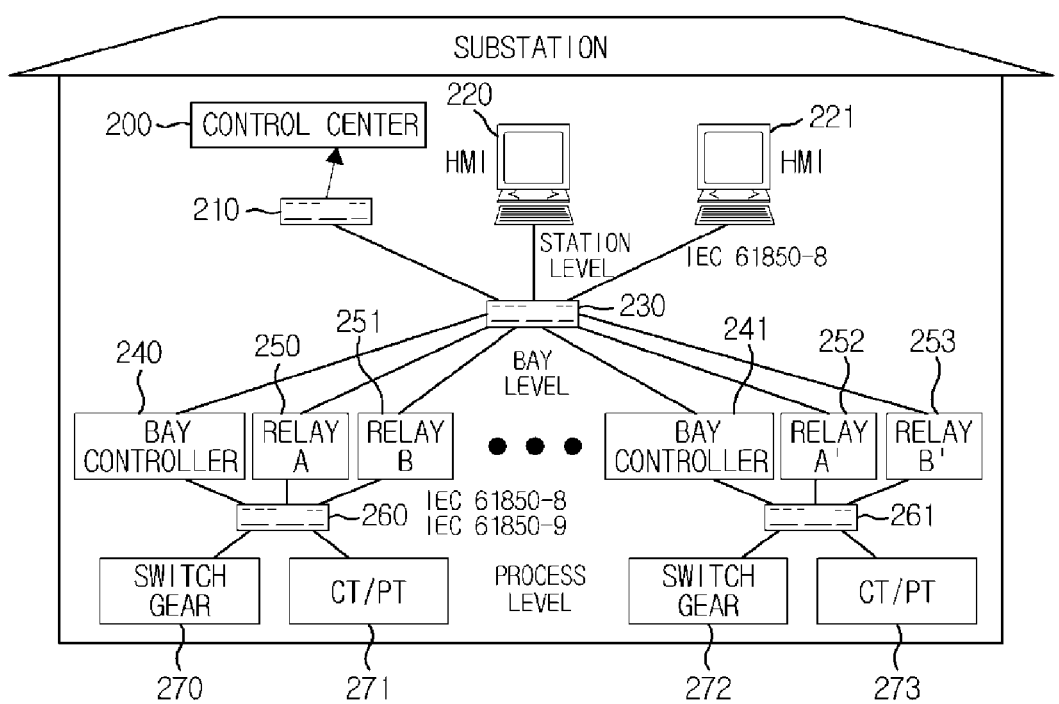
FIG. 2 is a structural view illustrating a substation system using IEC 61850 protocol.

The disclosed embodiments and advantages thereof are best understood by referring to FIGS. 1-5 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented. Accordingly, the described aspect is intended to embrace all such alterations, modifications, and variations that fall within the scope and novel idea of the present invention.

Meanwhile, the terminology used herein is for the purpose of describing particular implementations only and is not intended to be limiting of the present disclosure. The terms "first," "second," and the like, herein do not denote any order, quantity, or importance, but rather are used to distinguish one element from another. For example, a second constituent element may be denoted as a first constituent element without departing from the scope and spirit of the present disclosure, and similarly, a first constituent element may be denoted as a second constituent element.

As used herein, the terms "a" and "an" herein do not denote a limitation of quantity, but rather denote the presence of at least one of the referenced item. That is, as used herein, the singular forms "a", "an" and "the" are intended to include the plural forms as well, unless the context clearly indicates otherwise.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Also, "exemplary" is merely meant to mean an example, rather than the best. If is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated.

That is, in the drawings, the size and relative sizes of layers, regions and/or other elements may be exaggerated or reduced for clarity. Like numbers refer to like elements throughout and explanations that duplicate one another will be omitted. As may be used herein, the terms "substantially" and "approximately" provide an industry-accepted tolerance for its corresponding term and/or relativity between items.

Hereinafter, a relay dualization apparatus according to the present disclosure will be described in detail with reference to the accompanying drawings.

Although IEC-61850, the international standard for SA (Substation Automation) system has recommendably specified Ethernet method, there is no standard for dualization. Meanwhile, users desire a reduced cost while maintaining the hitherto-used dualized system for system safety.

The conventional dualized method of communication lines has failed to cope with generation of errors in the power apparatus itself, and a method of installing a repetitive backup system has to suffer a considerably high cost.

The present disclosure proposes an effective dualization method for relays (or IEDs) in a digital substation system employing a relay, a sensor and a circuit breaker that operate according to IEC 61850 international standards. The present disclosure is more effective when the system uses Ethernet for high speed communication. Furthermore, the present disclosure can avoid an overlapped investment for an entire system and enhance reliability for the entire system by way of fast restoration when an error or fault occurs in a relay. The present disclosure can also monitor an individual IED status using a high speed communication.

Now, the present disclosure will be illustrated with reference to the drawings, and like numbers refer to like elements throughout, and explanations that duplicate one another will be omitted.

Figure 4:
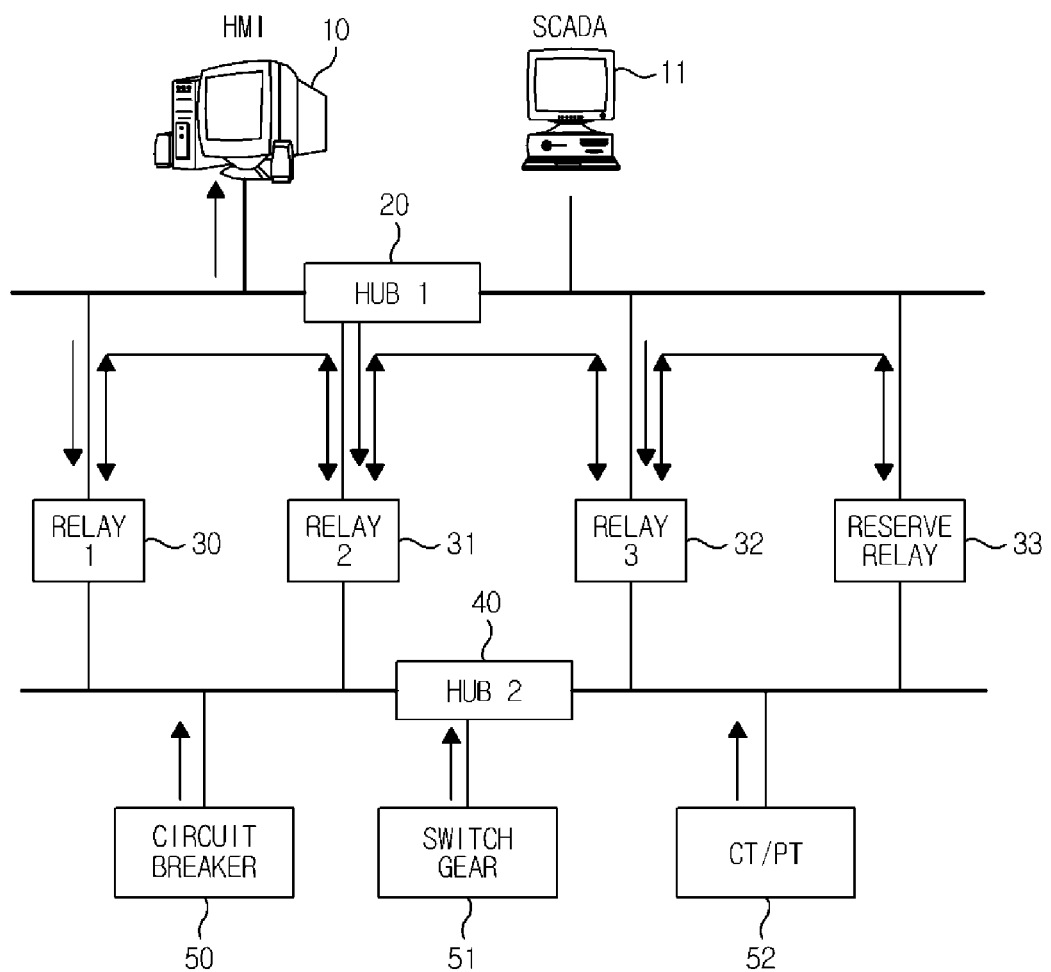
FIG. 4 is a schematic view illustrating a configuration of a relay dualization apparatus according to an exemplary embodiment of the present disclosure.

FIG. 4 is a schematic view illustrating a configuration of a relay dualization apparatus according to an exemplary embodiment of the present disclosure, where the apparatus operates at a normal status. FIG. 4 explains the relay dualization apparatus in a digital substation system using IEC 61850 protocol.

Referring to FIG. 4, the relay dualization apparatus according to an exemplary embodiment of the present disclosure comprises first, second and third relays (30 to 32) and a reserve relay (33). It should be apparent to the skilled in the art that, although the present disclosure has exemplified three relays of the main devices, the number of relays is not limited thereto, and the number of relays may be changed based on the system.

The first, second and third relays (30 to 32) receive power data from a circuit breaker (50), a switch gear (51) or CT/PT (52) which are lower units for collecting power data via Ethernet. A second hub (40) switches a signal related to the power data of the circuit breaker (50), the switch gear (51) or the CT/PT (52) which are lower units, and transmits the signal to the first, second and third relays (30 to 32).

It should be apparent to the skilled in the art that, although the present disclosure has exemplified the circuit breaker (50), the switch gear (51) or the CT/PT (52) for lower units, the lower units are not limited thereto, and any units that can transmit the power data from lower level may be all included as the "lower units".

Furthermore, the first, second and third relays (30 to 32) transmit the power data received from the circuit breaker (50), the switch gear (51) or the CT/PT (52) of lower units to an HMI (10) or an SCADA (Supervisory Control And Data Acquisition, 11) which are upper units for supervision and control. The first hub (20) switches a signal related to the power data of the first, second and third relays (30 to 32) and transmits the signal to the HMI (10) or the SCADA (11).

It should be apparent to the skilled in the art that, although the present disclosure has exemplified the HMI (10) or the SCADA (11) as the upper unit performing the supervision and control by receiving a signal from the first, second and third relays (30 to 32), the upper unit is not limited thereto, and any units that can perform the supervision and control by receiving a signal from the first, second and third relays (30 to 32) may be all included as the "upper units".

That is, the first, second and third relays (30 to 32) receive the power data from the circuit breaker (50), the switch gear (51) or CT/PT (52) which are lower units via the second hub (40), and transmit the power data received from the circuit breaker (50), the switch gear (51) or the CT/PT (52) of lower units to the HMI (10) or to the SCADA (11) via the first hub (20).

Meanwhile, the first, second and third relays (30 to 32) receive a control command from the HMI (10) or the SCADA (11) of upper units via the first hub (20), where the first hub (20) switches a signal related to the control command of HMI (10) or the SCADA of upper units, and transmit the signal to the first, second and third relays (30 to 32).

Furthermore, the first, second and third relays (30 to 32) transmit the control command received from the HMI (10) or the SCADA (11) of upper units to the circuit breaker (50), the switch gear (51) or the CT/PT (52) of lower units via the second hub (20). The second hub (20) switches a signal related to the control command of the first, second and third relays (30 to 32) and transmits the signal to the circuit breaker (50), the switch gear (51) or the CT/PT (52) of lower units.

That is, the first, second and third relays (30 to 32) receive a control command from the HMI (10) or the SCADA (11) of upper units via the first hub (20), and transmit the control command to the circuit breaker (50), the switch gear (51) or the CT/PT (52) of lower units via the second hub (20). Although not illustrated, the first, second and third relays (30 to 32) may include respectively-connected storages to store the received/transmitted power data and control command, and store data such as event and a system algorithm. However, It should be apparent to the skilled in the art that the data stored in the storages of the first, second and third relays (30 to 32) is not limited thereto, and data may be changed according to set-up of system.

The reserve relay (33) real-time or periodically ('period' may be arbitrarily determined) communicates with the first, second and third relays (30 to 32) respectively and stores data (power data, control command, event and system algorithm, etc.) stored by the first, second and third relays (30 to 32). The reserve relay (33) updates the storage data through real-time or periodical communication with the first, second and third relays (30 to 32). To this end, the relay dualization apparatus according to the present disclosure, though not illustrated, may include storage respectively connected to each relay (30 to 33). That is, the relay dualization apparatus according to the present disclosure may include a plurality of storages to store data of each relay (30 to 33), or include storage to divisionally store data of each relay (30 to 33).

In the system according to the present disclosure, because each constituent part complies with the IEC 61850 protocol, transmission of message among each constituent part may be carried out by GOOSE (Generic Object Oriented Substation Event) type. However, it should be apparent to the skilled in the art that the message transmission is not limited to the GOOSE method. Furthermore, communication method of each constituent part may utilize the Ethernet as explained above, and the communication method is not limited to the Ethernet either.

Figure 3A:
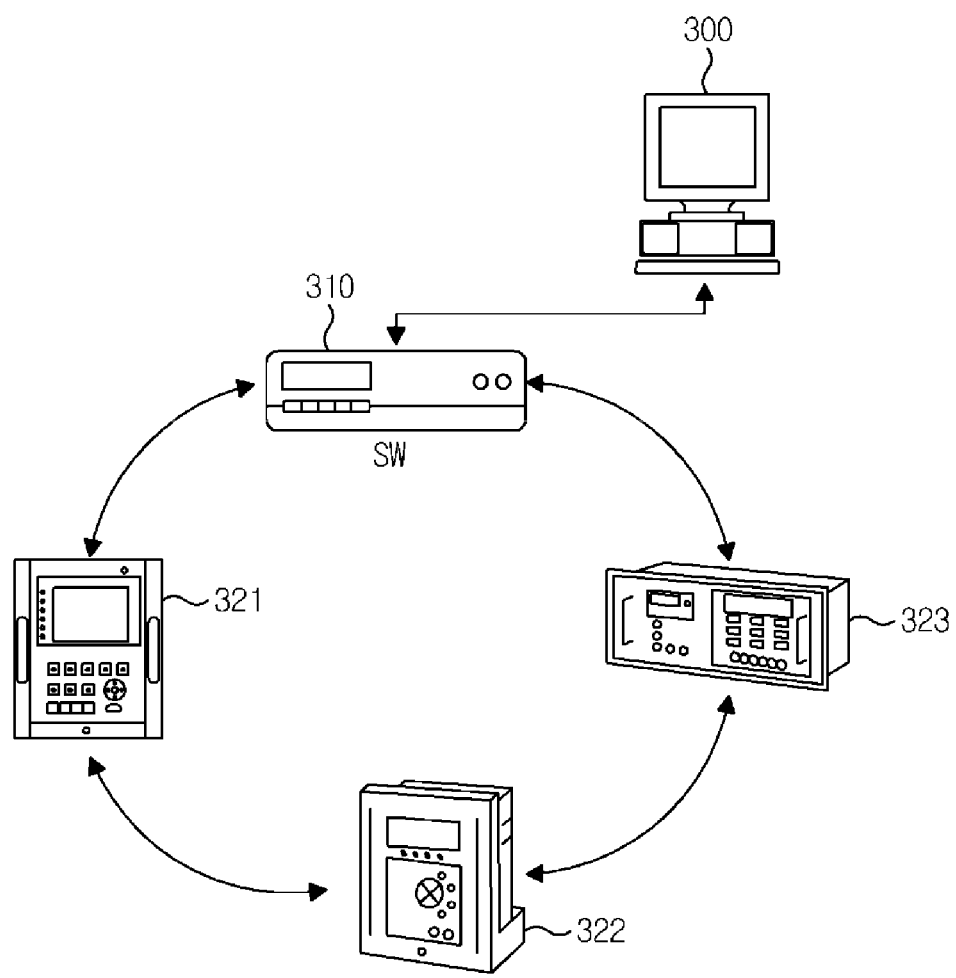
FIGS. 3a and 3b are exemplary views for illustrating a network method in a conventional substation system.
Figure 3B:
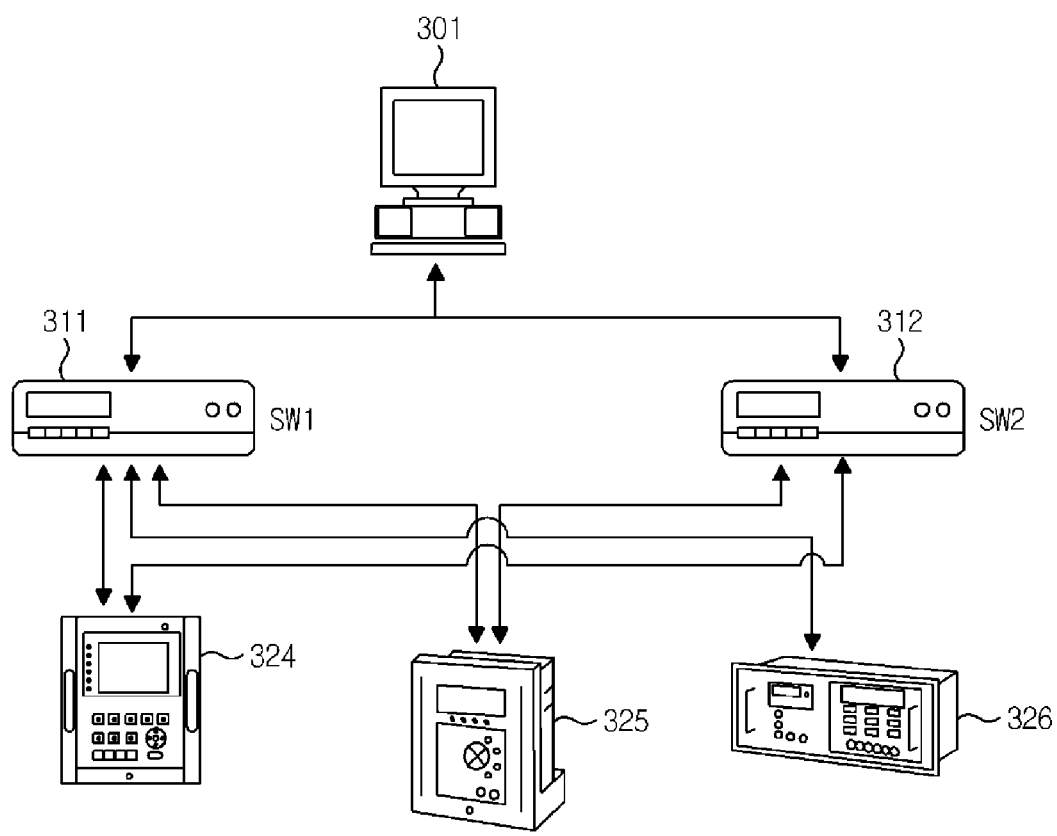

In a case a fault occurs in one of the relays during a normal operation status according to the conventional system illustrated in FIGS. 3a and 3b, the HMI (10) or SCADA (11) of upper unit infers the fault of a relevant relay by the fact there is no continuous communication. Now, a case of the relay dualization apparatus according to the present disclosure will be explained with reference to the following drawing.

Figure 5:
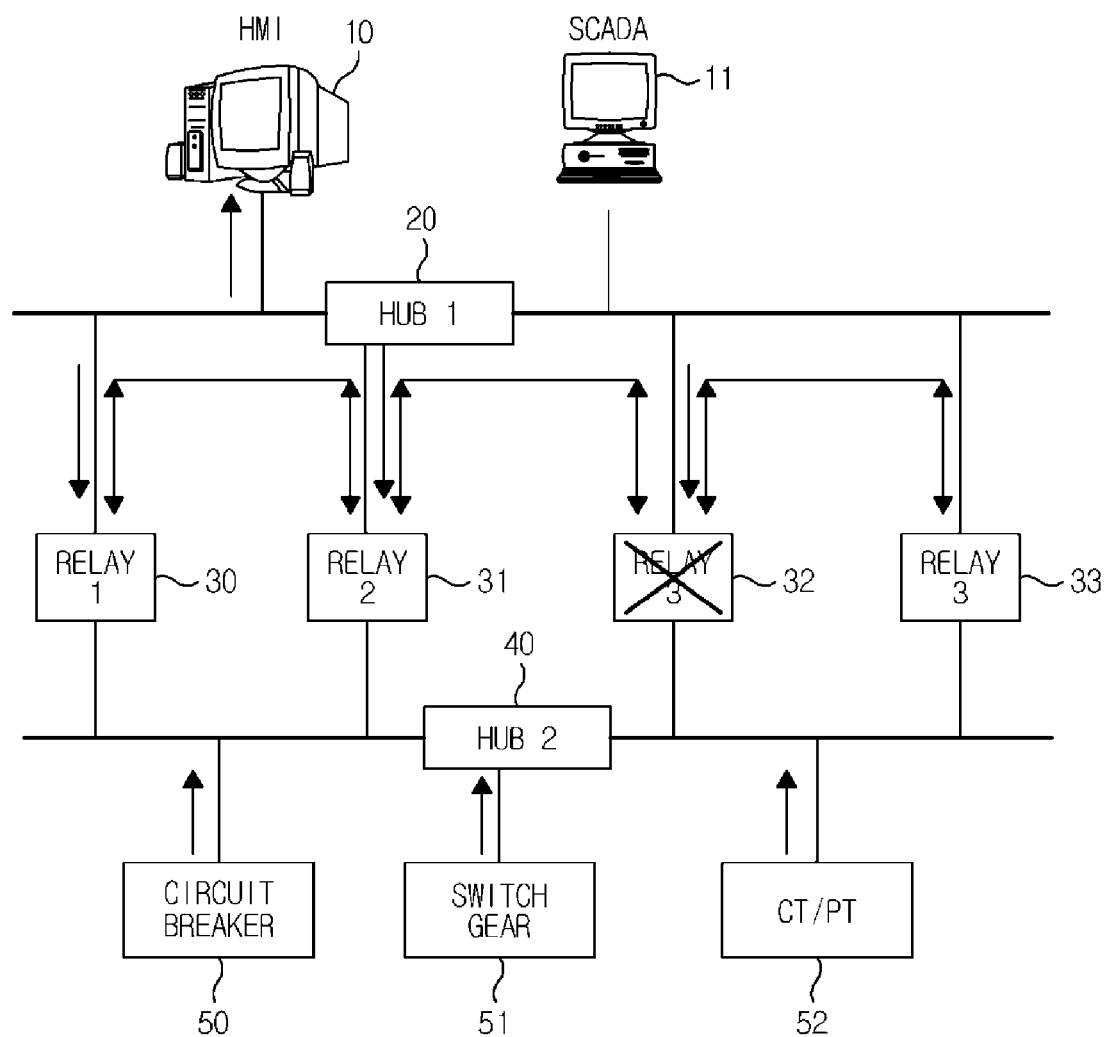
FIG. 5 is a schematic view illustrating a case where an error occurs at a third relay in FIG. 4 according to an exemplary embodiment of the present disclosure.

FIG. 5 is a schematic view illustrating a case where an error occurs at a third relay in FIG. 4 according to an exemplary embodiment of the present disclosure.

Referring to FIG. 5, in a case there is generated a fault in the third relay (32) in a system of FIG. 4, the relay dualization apparatus according to the present disclosure is such that the reserve relay (33) having a constant communication with the third relay (32) detects the occurrence of fault at the third relay (32), and notifies the occurrence of fault to the HMI (10) or SCADA (11) of upper unit.

In the exemplary embodiment of the present disclosure, the reserve relay (33) determines the status of the first to third relays (30 to 32) by real-time or periodical communication, and notifies a fault of a relay that repetitively reports the abnormal status to the HMI (10) or SCADA (11) of upper unit step by step (e.g., note, caution, warning, release, etc.).

Furthermore, the reserve relay (33) uses the information of the third relay (32) stored in the storage (not shown) to operate in lieu of the third relay (32). Under this context, the reserve relay (33) is illustrated as the third relay (32) in FIG. 5.

The reserve relay (33) replaces the third relay (32) until the fault of the third relay (32) is restored to maintain a normal operation status, where the reserve relay (33) transmits the power data of the lower units {the circuit breaker (50), the switch gear (51) or the CT/PT (52)} to the upper units {the HMI (10) or SCADA (11)}, and transmits the control command of the upper unit {the HMI (10) or SCADA (11)} to the lower units {the circuit breaker (50), the switch gear (51) or the CT/PT (52)}.

The replacement of faulty relay (32) by the reserve relay (33) thus discussed may be performed by a transfer command of the SCADA (11) of upper unit that has received a notification of fault occurrence from the reserve relay (33). However, this is not to rule out the fact that the reserve relay (33) itself performs a replacement role of the third relay (32) that has developed the fault.

That is, the relay dualization apparatus according to the present disclosure is such that the reserve relay (33) is added to the conventional single system to real-time or periodically receive inner data of each relay (30~32) such as status information, control command, power data and event from other relays (30 to 32), and stores the inner data in the storage (not shown), and replaces a relevant relay based on the data of the relevant relay in a case a fault is generated on an arbitrary relay as shown in FIG. 5.

As noted above, an entire system according to the present disclosure can perform a continued surveillance and control regardless of a relay that has developed a fault. Furthermore, because the reserve relay (33) monitors the general relays (30 to 32) under the normal status, and in a case one of the relays develops an abnormal status, the reserve relay (33) can quickly notify the occurrence of abnormal status to a user, whereby a greater fault can be prevented in advance.

As apparent from the foregoing, the relay dualization apparatus according to the present disclosure can replace other relays with a minimum number of reserve relays for restoring generated fault free from dualized and overlapped use of equipment, whereby an economical system can be realized and the occurrence of fault can be quickly coped with.

Although the conventional technique cannot statically determine a reserve relay because faults occur at any time in the power system, data can be real-time or periodically exchanged with other relays to apply the reserve relay to the dynamically changing power system according to the present disclosure.

Although the present disclosure has been described with reference to a number of illustrative embodiments thereof, it should be understood that numerous other modifications and embodiments can be devised by those skilled in the art that will fall within the spirit and scope of the principles of this disclosure.

More particularly, various variations and modifications are possible in the component parts and/or arrangements of subject combination arrangement within the scope of the disclosure, the drawings and the appended claims. In addition to variations and modifications in the component parts and/or arrangements, alternative uses will also be apparent to those skilled in the art.

What is claimed is:

1. A relay dualization apparatus in a substation automation system including at least one or more upper units and at least one or more lower units, the apparatus comprising:
    a plurality of first relays receiving a power data from the lower unit using a predetermined communication method, and transmitting the power data to the upper unit, and
    receiving a control command from the upper unit and transmitting the control command to the lower unit; and
    a second relay performing communications with the plurality of first relays using the communication method to replace a relay that has generated an error in the plurality of relays;
    wherein each of the plurality of first relays comprises a first storage storing the power data, the control command, and event and system algorithm;
    wherein the second relay comprises a second storage storing the power data, the control command, the event and the system algorithm communicated by the plurality of first relays, received from the plurality of first relays;
    wherein the second storage comprises a plurality of storages to store the data of each of the plurality of first relays, or comprises a storage to divisionally store the data of each of the plurality of first relays;
    wherein the second relay performs a real-time or periodical communication with the plurality of first relays and updates the second storage in real-time or periodically; and
    wherein the second relay performs to replace the relay that has generated an error in the plurality of relays based on the power data, the control command, the event and system algorithm in the second storage.

2. The apparatus of claim 1, wherein the second relay detects an error of a relay in the plurality of first relays and notifies the error to the upper unit.

3. The apparatus of claim 2, wherein the upper unit transmits to the second relay a switch command replacing the erroneous relay with the second relay.

4. The apparatus of claim 2, wherein the second relay replaces an erroneous relay.

5. The apparatus of claim 1, further comprising a first hub switching at least one or more upper units with a plurality of first relays and the second relay.

6. The apparatus of claim 1, further comprising a second hub switching the plurality of first relays and the second relay with at least one or more lower units.

7. The apparatus of claim 1, wherein the predetermined communication method is Ethernet communication method.

* * * * *